Feb. 4, 1969  H. W. FIELD  3,425,156
ENGINE SOUND SIMULATOR
Filed Oct. 21, 1965
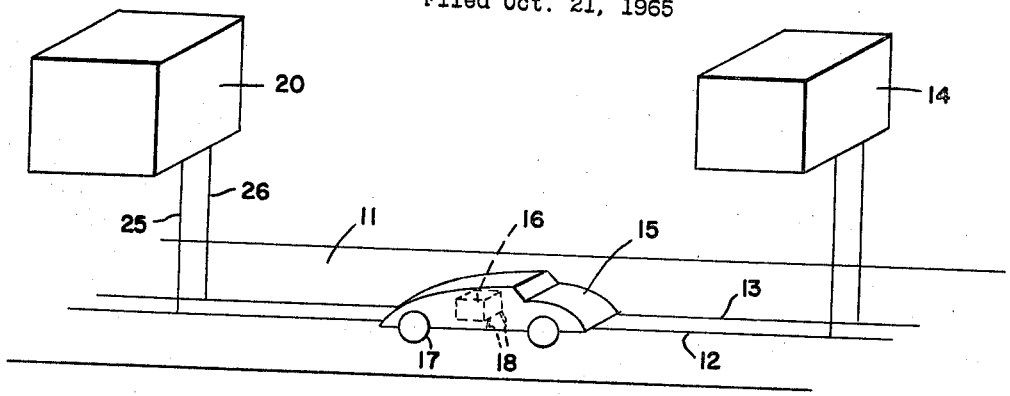
FIG_1
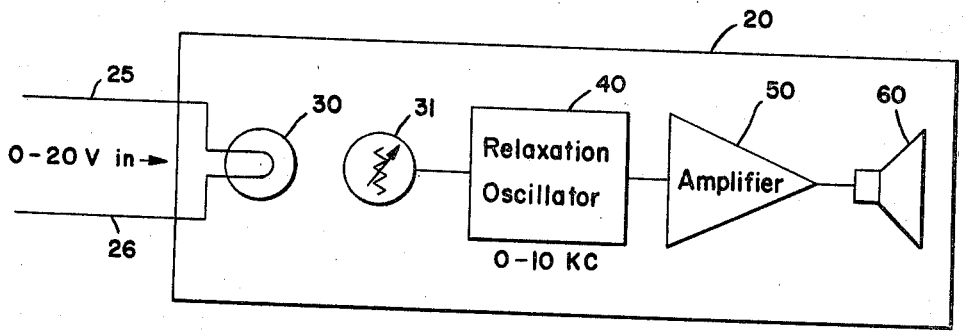
FIG_2
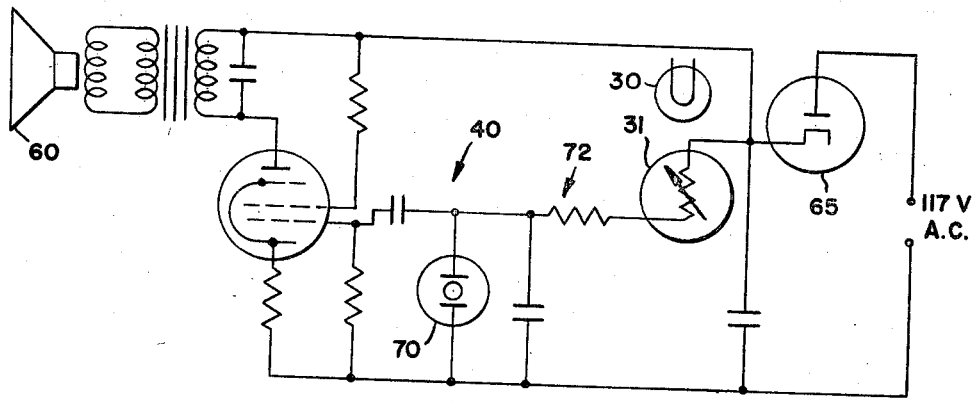
FIG_3
*INVENTOR.*
HARRY W. FIELD
BY
Paul B. File
PATENT AGENT

United States Patent Office 3,425,156
Patented Feb. 4, 1969

3,425,156
ENGINE SOUND SIMULATOR
Harry W. Field, 2366 Warburton,
Santa Clara, Calif. 95050
Filed Oct. 21, 1965, Ser. No. 499,419
U.S. Cl. 46—232         5 Claims
Int. Cl. A63h *33/26;* H01j *39/12*

ABSTRACT OF THE DISCLOSURE

An engine sound simulator for electric cars or the like which are powered from a variable source of voltage which includes a lamp energized from the same variable source of voltage and arranged to control the frequency of an oscillator whose output is delivered to a loudspeaker or other sound reproduction device so that the frequency of sounds emanating therefrom will increase in direct proportion to the increased speed of the car.

---

This invention relates to an engine sound simulator for model racing car systems, and more particularly to an engine sound simulator wherein a sound produced by said simulator varies in sound level proportional to an increase or decrease in voltage applied to the model racing car system.

Numerous model racing cars and systems for operating and racing said cars in a realistic manner have been developed wherein the small racing cars are powered by direct current motors mounted interior of the cars. By varying the direct current to the motor by any suitable means such as a rheostat, the cars will increase or decrease in speed in accordance with the voltage applied at the motor in the car.

Ordinarily, the direct current voltage is applied to a pair of parallel conductors recessed within a flat running surface known as the "track." Contact means are provided on the racing car for interconnecting the direct current motor with the parallel conductors to energize the motor.

As a point of interest, the scaled realism of the racing cars and systems allows a competitive approach to these racing cars that is not unlike the competitive aspects of full scale racing cars. Interest in model racing is increasing, and many establishments are equipped to conduct what is now known as "slot-racing" wherein a number of cars may be raced competitively on a track having a plurality of parallel conductors, each adapted to be energized by a source of variable direct current voltage.

It is to achieve the effect of "realism" that the present invention is directed, in that an engine sound simulator is provided wherein the engine sound frequency or "whine" increases with an increase in direct current voltage, or decreases with a decrease in voltage. Consequently, as a racing car is energized to travel at an increased speed, the engine sound broadcast by the simulator will increase in frequency and vice versa.

It is, therefore, a principal object of the invention to provide a device for simulating engine sound wherein said sound frequency corresponds to the speed of the racing car.

It is another object of the invention to provide an effective and economical means for achieving engine sound simulation for model racing cars operating in conjunction with a pair of parallel conductors.

It is a further object of this invention to provide an electrically energized device responsive to changes in voltage for producing realistic engine sounds substantially proportional in frequency to the speed of a model racing car.

It is another object of this invention to provide an improved circuit for sensing direct current voltage variations and translating said variations into simulated engine sound frequency variations in correspondence to a model racing car also powered by said direct current voltage variations.

It is a still further object of this invention to provide an improved means for sensing voltage variation for producing simulated engine sounds.

A clear conception of the several features constituting the present invention and mode of constructing the same may be had by referring to the drawings accompanying and forming a part of this specification, wherein like reference characters designate the same or similar parts in the various views.

These and other objects and advantages of the invention will become apparent from the following detailed description and drawings of which:

FIGURE 1 is a partial schematic view of a racing car track and model racing car system embodying the invention;

FIGURE 2 is a schematic block diagram of an improved circuit embodying the invention; and FIGURE 3 is a detailed circuit diagram thereof.

While the improvements have been illustrated and described as being especially advantageously embodied in a model racing car system, it is not intended to thereby necessarily limit or restrict the invention. It is also contemplated that certain descriptive terminology used herein shall be given the broadest possible interpretation consistent with the disclosure.

Referring now to FIG. 1 a track 11 is shown provided with parallel electrical conductors 12 and 13, energized from a variable direct current source 14. A model racing car 15 is provided with a direct current motor 16 energized by contact with conductors 12 and 13 to drive a pair of wheels 17 in a manner well known in the art. The motor 16 is provided with connecting means 18 for frictionally engaging said conductors so that the motor is continuously energized by direct current when said direct current source is energized to produce a voltage, for example in a range from 0–20 volts.

Also connected to the conductors 12 and 13, in parallel therewith, is a sound simulator device 20, to be described in greater detail hereinafter. Said sound simulator 20 is connected in parallel to the motor 16 through wires 25, 26 so that the same direct current voltage that energizes the motor also energizes a portion of the sound simulator. The basic concept of connecting the sound simulator device in parallel with the motor 16 is to effectuate an electrically simulated sound direct relationship with motor voltage, and consequently in direct relationship with the model racing car speed. As the voltage at the direct current variable power source is increased to increase the speed of the racing car, the sound simulator device 20 increases its sound frequency to produce the effect of a racing engine at an increased speed.

Referring now to FIG. 2 wherein a block diagram of the sound simulator device 20 is shown, the mentioned wires are connected to a lamp 30. As the voltage across the lamp 30 is increased, the light intensity increases, and vice versa. Adjacent to the lamp 30 and exposed to the light intensity of the lamp is a light dependent resistor 31, which, in the preferred embodiment is a cadmium sulfide photocell such as is illustrated on page 166 of Lafayette Electronics Company, 1964 catalog No. 640.

Such light dependent resistors are well known in the art and respond to changes in light intensity. As the light intensity from lamp 30 is varied by changes in direct current voltage, the resistance of resistor 31 changes to control the frequency of relaxation oscillator 40 having a neon bulb 41 whose firing potential is 90 volts and whose extinction potential is approximately 65 volts. The output of the oscillator 40 varies between 0 cycles and 10 kilocycles and is amplified by amplifier 50 for producing a simulated sound at a small speaker 60. Thus, as the light intensity of lamp 30 is varied in accordance with the direct current voltage applied thereto, the light dependent resistor 31 changes the frequency of the relaxation oscillator 40 to cause amplified sound to emit from speaker 60 at a frequency directly proportional to the speed of the model racing car being energized by the same direct current voltage. An increase in direct current voltage increases the sound frequency from speaker 60 to simulate the "whine" of a speeding racing engine. Simultaneously the racing car is driven at a greater speed by the motor in response to the same direct current voltage so that car speed and simulated sound are correlated.

Reference is now made to FIG. 3 wherein the details of the sound simulator are disclosed as powered from a source of A.C. voltage, normally 117 volts. The lamp 30, described hereinabove, is located adjacent light dependent resistor 31, wherein the resistor 31 is exposed to variations in light intensity as occasioned by the variations of direct current voltage applied to lamp 30.

The alternating current is rectified by a conventional rectifier 65, and the resultant direct current is applied to neon bulb 70 through a resistance-capacitance network 72 including the light dependent resistor 31. The capacitor charges to approximately 90 volts D.C. through the resistor 31 whereupon the neon bulb 70 ionizes to discharge the capacitor. At approximately 65 volts the neon bulb 70 will de-ionize and stop conducting. The capacitor will charge again and the neon bulb will again conduct at 90 volts. The charging rate of the capacitor will be determined by the resistance value of resistor 31. By changing the resistance value, the frequency will change; an increasing resistance causing a decreasing frequency and vice versa.

The light dependent resistor 31 changes with a change in intensity of light striking it and thereby changes and controls the frequency of the relaxation oscillator 40. The light dependent resistor 31 resistance value decreases with an increase in light intensity from lamp 30; therefore, as the voltage to the motor 16 is increased, the light intensity at lamp 30 is increased to cause a decrease in the resistance of the resistor 31 and a resultant increase in frequency of the relaxation oscillator 40 that is directly proportional to the speed of the model racing car. The output voltage across the neon bulb is approximately 25 volts, peak to peak, and is introduced at the control grid of the 50C5 amplifier having the speaker 60 connected across its output in a conventional fashion. The sound emitted from the speaker 60 simulates that of a racing engine and increases and decreases in frequency according to the increase and decrease of the speed of the model racing car as occasioned by the variable voltage applied to both motor 16 and lamp 30.

In operation, the model racing car 15 is placed on the track so that the motor 16 is electrically connected to the pair of conductors 12 and 13, energized from the variable direct current power source. The engine sound simulator device 20 is also connected to the conductors 12 and 13, so that the same voltage is applied to lamp 30 as to motor 16. As the speed of the car is increased by an increase in direct current voltage, the voltage also causes an increased frequency of the sound from speaker 60. In this way, realism is added to the racing of model racing cars by having realistic sounds produced in accordance with the speed of the model racing cars.

Having now described and illustrated the invention, it is to be understood that the invention is not to be limited to the specific form or arrangement of the parts herein shown.

What is claimed is:
1. A circuit for controlling sound simulation in response to illumination level comprising
    means for powering an illuminating means to increase or decrease illumination,
    resistance means responsive to said increase or decrease of illumination wherein said resistance of said resistance means decreases with an increase in illumination,
    said resistance means being part of a resistance-capacitor circuit wherein variance of said resistance varies the charging rate of said capacitor,
    means including a neon bulb arranged to ionize and de-ionize at predetermined voltages to discharge and charge said capacitor in accordance with changes in said resistance by said illuminating means,
    said resistance changing the frequency of capacitor charging in proportion to the illumination level; and
    speaker means connected to said neon bulb means so as to increase and decrease the frequency of sounds emanating from said speaker proportional to changes in resistance.

2. An engine sound simulator for model racing car systems comprising,
    a variable voltage source,
    a track means for said racing car connected to said variable source of voltage,
    a racing car having propelling means energized by said track means wherein said racing car travels along said track means at a rate dependent upon the voltage applied to said track means, and
    means connected to said variable voltage source for simultaneously producing simulated engine sounds proportional in frequency to the rate of travel of said racing car.

3. The combination of claim 2 wherein said means connected to said variable voltage includes a light producing means connected in parallel to said car propelling means wherein said light producing means increases in intensity with an increase in voltage,
    means including a speaker responsive to light intensity to cause said speaker to emanate sounds whose frequency varies with an increase or decrease in voltage applied to said propelling means,
    whereby engine sound simulation is produced to correspond in frequency with the rate of travel of said racing car along said track means.

4. The combination of claim 3 wherein said light responsive means includes a relaxation oscillator responsive to a change in light intensity wherein frequency of said relaxation oscillator increases with an increase in light intensity.

5. The combination of claim 4 wherein said light responsive means includes a light dependent resistor for decreasing resistance in response to an increase in light intensity for increasing the frequency of said relaxation oscillator.

References Cited

UNITED STATES PATENTS 2,408,589   10/1946   Wells _____ 250—217
2,610,437    9/1952   Smith _____ 46—232

LOUIS G. MANCENE, *Primary Examiner.*

R. F. CUTTING, *Assistant Examiner.*

U.S. Cl. X.R.
250—206